(No Model.) A. J. LANGELIER. 9 Sheets—Sheet 1.
HEEL MACHINE.

No. 331,412. Patented Dec. 1, 1885.

FIG. 1.

WITNESSES:
Chas. F. Schmelz.
Joseph J. Scholfield

INVENTOR:
Antoine J. Langelier
per S. Scholfield
Attorney (No Model.)

A. J. LANGELIER.
HEEL MACHINE.

Patented Dec. 1, 1885.

FIG. 2.

WITNESSES:
Chas. F. Schmelz
Joseph J. Scholfield

INVENTOR:
Antoine J. Langelier
per S. Scholfield
Attorney (No Model.) A. J. LANGELIER. 9 Sheets—Sheet 3.
HEEL MACHINE.

No. 331,412. Patented Dec. 1, 1885.

FIG. 3.

(No Model.) 9 Sheets—Sheet 4.

A. J. LANGELIER.
HEEL MACHINE.

No. 331,412. Patented Dec. 1, 1885.

WITNESSES:
Chas. F. Schmitz
Joseph J. Scholfield

INVENTOR:
Antoine J. Langelier
per J. Scholfield
attorney (No Model.)  A. J. LANGELIER.  9 Sheets—Sheet 5.
HEEL MACHINE.

No. 331,412.  Patented Dec. 1, 1885.

FIG. 6.

WITNESSES:  INVENTOR:

(No Model.)

A. J. LANGELIER.
HEEL MACHINE.

No. 331,412. Patented Dec. 1, 1885.

WITNESSES:
Chas. F. Schmitz
Joseph J. Scholfield

INVENTOR:
Antoine J. Langelier
per S. Scholfield
Attorney (No Model.)　　　　　　A. J. LANGELIER.　　9 Sheets—Sheet 9.
HEEL MACHINE.

No. 331,412.　　　　　　　　Patented Dec. 1, 1885.

WITNESSES:　　　　　　　　　　　　　　INVENTOR:
Chas. F. Schwetz.　　　　　　　　　　　Antoine J. Langelier
Joseph J. Scholfield　　　　　　　　　per J. Scholfield
　　　　　　　　　　　　　　　　　　　　attorney

UNITED STATES PATENT OFFICE.

ANTOINE J. LANGELIER, OF PROVIDENCE, RHODE ISLAND.

HEEL-MACHINE.

SPECIFICATION forming part of Letters Patent No. 331,412, dated December 1, 1885.

Application filed July 9, 1885. Serial No. 171,107. (No model.)

*To all whom it may concern:*

Be it known that I, ANTOINE J. LANGELIER, of Providence, in the State of Rhode Island, have invented a new and useful Improvement in Heel-Machines, of which the following is a specification.

My invention relates to additional improvements upon the heel-machine secured to me by Letters Patent of the United States No. 317,149; and it consists in improved devices for operating the cutting-plungers and for operating the valve of the pasting device, in an additional device for pricking the lifts preparatory to the insertion of the nails, and in additional improved heel-nailing and heel-attaching devices, and in minor details of the construction of the machine.

In the accompanying drawings, A is the supporting-frame of the machine, and B the table in which the heel-lift cutters C C' are securely held by means of the cutter-holders D D'.

Figure 26:
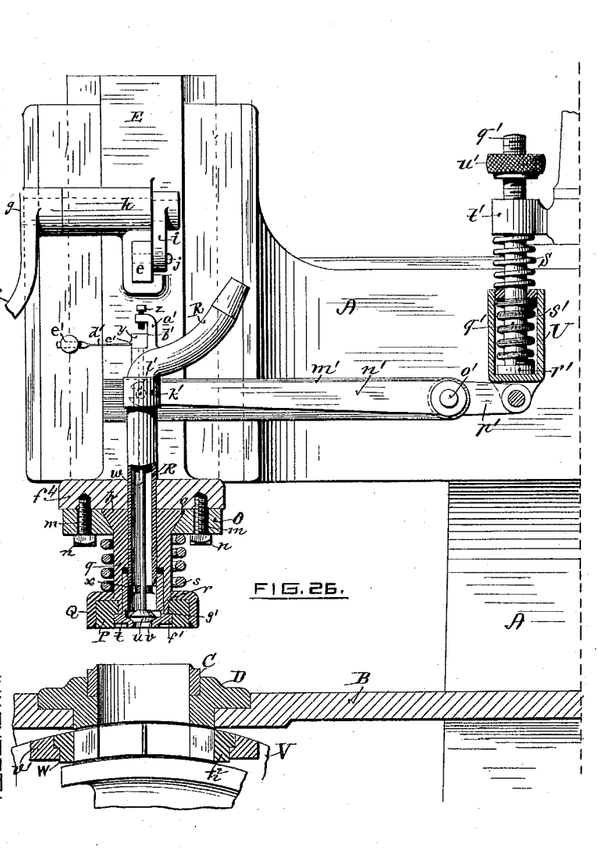
Figs. 26, 27, and 28 are enlarged detail views of the heel-lift cutting and paste-applying mechanism.
Figures 27, 28, 29, 30:
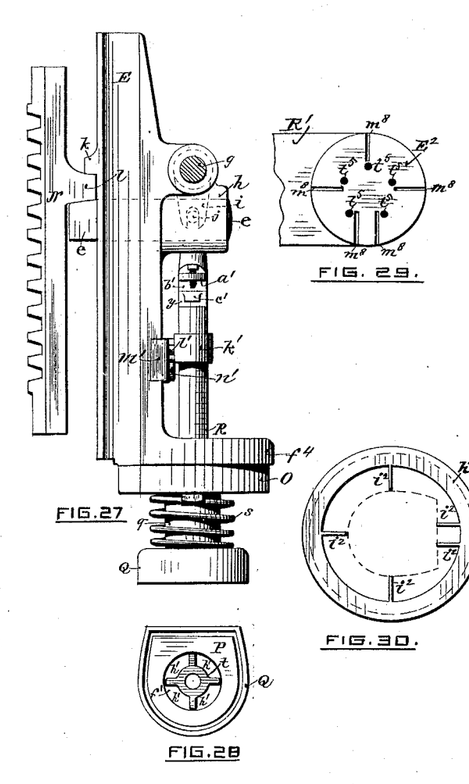
Fig. 29 is an end view of the nailing-plunger.
Fig. 30 is a plan view of the carrier-bushing provided with integral guiding-plates.

To the upward extension of the frame A, which branches laterally in opposite directions, are secured the sliding heads E E', to which an up-and-down movement is imparted by means of the two-movement cam F, which is secured to the loose gear G, held upon the main shaft H, and from which operative connection is made to the sliding heads E E' by means of the lever I, pivoted to a lug, $a$, extending outward from the edge of the shaft-bearing standard J, and provided with a friction-roll, $b$, (shown by dotted lines in Fig. 3,) adapted to enter the groove $c$ of the cam, a portion of which is shown in dotted lines; the adjustable connecting-rod K, arm L, secured to the center of the rock-shaft L', which is held in the opposite bearings, $d$ $d$, segmental gears M M', secured to the shaft L', and sliding racks N N', which are operatively connected to the sliding heads E E' by means of the sliding bolt $e$, which passes centrally through the sliding heads at a forwardly-projecting boss, $h$, as shown in Figs. 26 and 27, the said bolt $e$ being operated back and forth through the sliding head by means of the handle $f$, secured to one end of the short shaft $g$, which passes through a transverse bearing in the projecting boss $h$, and the forked arm $i$, secured to the opposite end of the shaft $g$ and extending downward to embrace a pin, $j$, which projects from one side of the bolt $e$, as shown in Fig. 26 and by dotted lines in Fig. 27.

The back side of the sliding head E or E' is provided with a projection, $k$, and the adjacent side of the sliding rack is provided with a projection, $l$, which is adapted to engage with the projection $k$ of the sliding head upon the upward movement of the rack, so that when the bolt $e$ is thrown back into locking engagement with the projection $l$ of the rack, a vertically-directed reciprocating movement will be imparted to the sliding head, and when the said bolt is thrown back from the rack, by operating the handle $f$ for that purpose, the sliding head, after reaching its highest point of elevation in its slides, will cease to reciprocate with the rack. Thus while the racks N N' are to have a continuous reciprocating movement imparted to them from the cam F, the specific reciprocating movement imparted to either of the sliding heads E or E' will be under the control of the operator of the machine.

To the under side of the outwardly-projecting lip $f^4$ of the sliding head E or E' is secured the conically-bored clamping-piece O, which is made capable of a slight adjustment relatively to the sliding head by means of the enlarged holes $m$ for the holding-screws $n$. (Shown in central vertical section in Fig. 26.) The conical opening $o$ of the clamping-piece is adapted to fit the conically-enlarged head $p$ of the hollow shank $q$ of the cutting-plunger, and the head $p$ is securely held against the under side of the lip $f^4$ of the sliding head by means of the holding-screws $n$.

Upon the lower end of the hollow shank $q$ is secured the cutting-plunger P, which is made in the form of a heel-section, as shown in Fig. 28, which shows an under side view of the cutting-plunger and its attached accessories, the plunger P being made to screw against a shoulder, $r$, and loosely upon the shank $q$, and over the plunger P is placed the holder Q, made to fit the cylindrical exterior of the shank $q$, and also the sides of the heel-shaped plunger P, as shown in Fig. 28, and between the holder Q and the lower face of the clamping-piece O is placed the spiral spring $s$, which operates to force the inwardly-directed flange of the holder Q to its normal resting-point against the upper side of the plunger P. The shank $q$ is centrally bored to receive the sliding paste-tube R, to the lower end of which is secured the valve-holder $t$. The tube R also serves as a forcer to carry the heel-lifts downward through the cutter and into the carrier-openings. The valve $u$, which rests on the conical valve-seat $v$, is provided with a stem, $w$, held loosely in a suitable guide at the point $x$ within the bore of the tube, and extends upward until it terminates in an enlarged head, $y$, outside of the laterally-deflected tube R. The rise and fall of the valve $u$ is regulated by the screw $z$, which is held vertically over the head $y$ in a laterally-deflected arm, $a'$, which at its base is joined to the exterior of the tube R. The head $y$ may be made square, and thus be prevented from turning by resting with one face against the plane face $b'$ of the upright portion of the arm $a'$, and is also to be provided with a slight triangular projection, $c'$, located upon the side of the head opposite the arm $a'$, which projection is adapted to engage with the outer end of the flat spring $d'$, which is secured to a short standard, $e'$, projecting from the outer slide-piece of the frame, the spring $d'$ being arranged to nearly touch the adjacent side of the head $y$.

Figure 1:
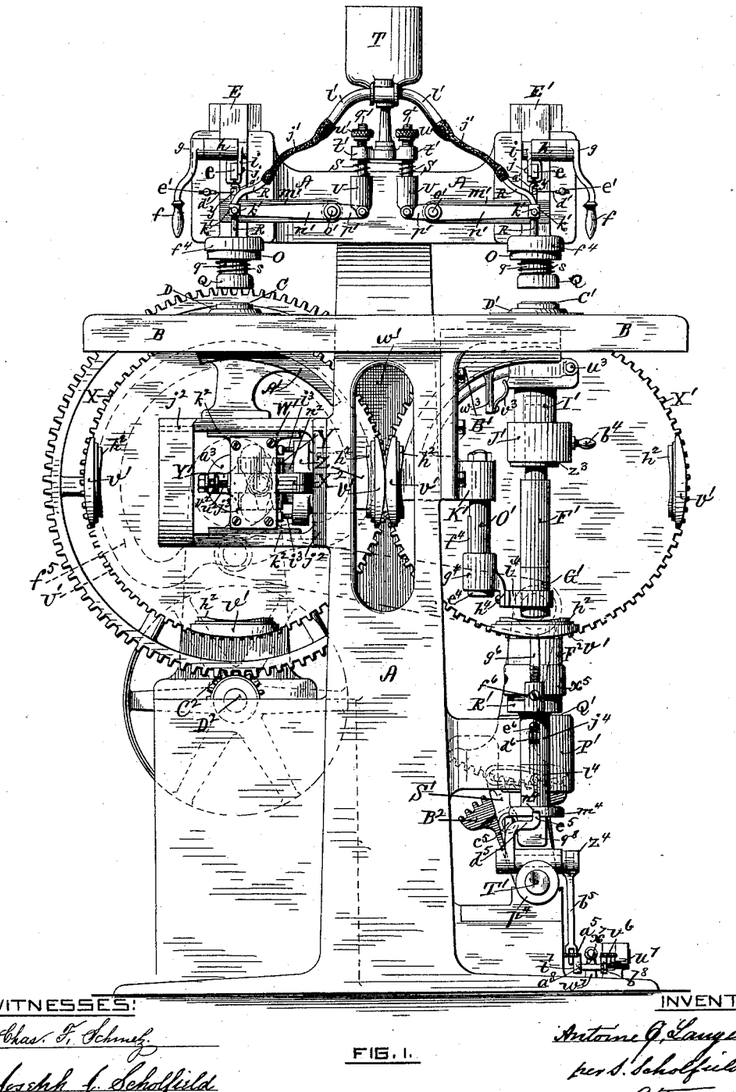
Figure 1 represents a front elevation of my improved heel-machine.

The valve-holder $t$ is provided with a flange, $f'$, which at the upward position of the cutting-plunger rests against the shoulder $g'$ at the lower end of the hollow cylindrical shank $q$, being held thereto by means of a spring device, to be hereinafter described. The flange $f'$ is also provided at its lower side with the clearing-recesses $h'\ h'\ h'\ h'$. The deflected tube R is connected with one of the outlet-pipes, $i'$, of the elevated paste-cup T, by means of a flexible tube, $j'$, as shown in Fig. 1. The tube R, immediately below the point of deflection, is provided with an enlargement or collar, $k'$, having on its rearward side a projecting pin, $l'$, as shown in Fig. 27 and by dotted lines in Fig. 26, by means of which an up-and-down sliding movement may be imparted to the tube.

To the projecting forward side of the sliding head E or E', and extending at right angles thereto, is secured the rigid arm $m'$, to the outer end of which is pivotally secured the vibrating arm $n'$, forked at its outer end to embrace the pin $l'$ of the tube R, and to the pivot-pin $o'$, at the opposite side from the arm $n'$, is secured the shorter arm $p'$, so that the two arms $n'$ and $p'$ will operate as a single lever pivoted to the arm $m'$.

To the outer end of the arm $p'$ of the lever $n'\ p'$ is pivoted the cylindrical box U, within which is placed the bolt $q'$, provided at its lower end with the head $r'$, between which and the perforated upper end of the box is placed the spiral spring $s'$, which is to be made more rigid than the spring S, which encircles that portion of the bolt lying between the upper end of the box U and the projecting lug $t'$, which is either secured to or forms an integral portion of the frame A. The bolt $q'$ passes loosely through the perforation of the lug $t'$, and is provided with a screw-thread and milled nut, $u'$, by means of which the up-and-down movement of the bolt may be adjusted.

Below the table B, in the vertical plane of the heel-lift-cutting mechanism, hereinbefore described, are placed the intermittently, revolving carrier-wheels V V', which are arranged to revolve in opposite directions, the receiving-openings W for the reception of the heel-lift-guiding plate bushings being formed in the lugs $v'\ v'\ v'\ v'$, which project at equal distances from each other from the front side of the interlocking gears X X', the adjacent peripheries of the gears and the carrier-lugs being made to pass within the vertical slot $w'$ in the frame A. The carrier-wheel V is provided with a hub, $x$, which forms a journal for the wheel and is loosely held in the bearing $y'$, the projecting rear end of the hub being provided with four clutch-spurs, $z'$, which are adapted to engage with the corresponding spurs, $a^2$, of the sliding clutch Y, arranged upon the shaft H, which passes through the bore of the hub $x'$ of the carrier-wheel V. The carrier-wheel V' is provided with a backwardly-projecting solid hub, $c^2$, which forms a journal for the carrier-wheel, being held within the bearing $d^2$ by means of the end cap or disk, $e^2$. The openings W, made in the lugs $v'$ of the carrier-wheels, are adapted to hold the heel-lift-guiding bushing $h^2\ h^2\ h^2\ h^2$, which are preferably made of cast metal, having integral inwardly-projecting plates $i^2$, the inner edges of which are adapted to closely embrace and guide the edges of the heel-lifts and to hold them in the proper position for the subsequent action of the machine.

Figure 5:
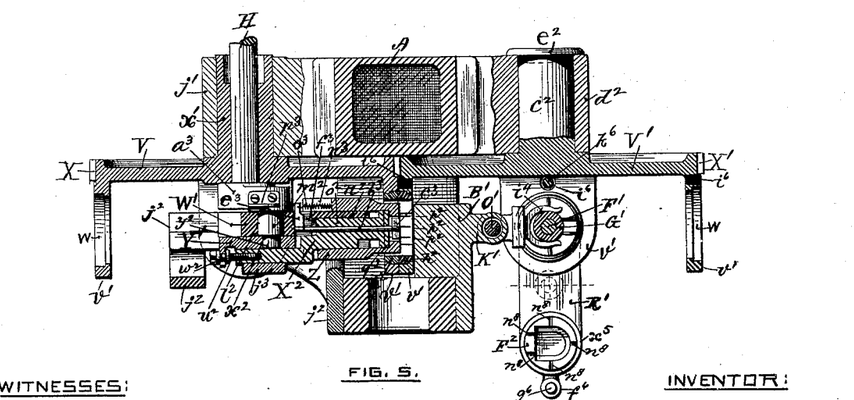
Fig. 5 is a horizontal section taken through the axis of the carrier-wheels and the lift-pricking forcer.
Figure 7:
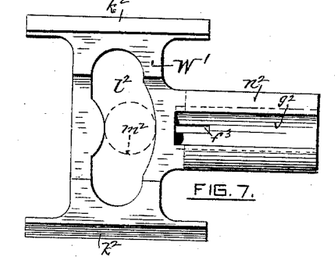
Figs. 7 to 19, inclusive, are enlarged detail views of the several parts of the pricking mechanism.
Figure 8:
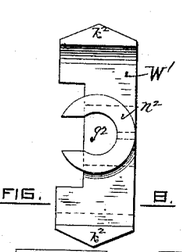
Figure 13:
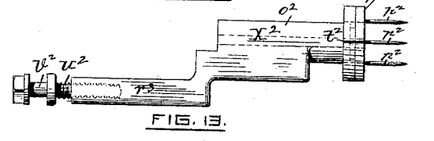
Figure 14:
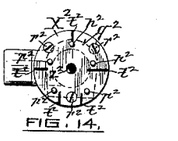

To the left-hand side of the upright standard of the frame A, at the front edge of the slot $w'$, is secured the slide-piece $j^2$, which is adapted to receive the sliding head W', (shown in enlarged detail in Figs. 7 and 8,) being provided with the V-shaped edges $k^2$, which fit the corresponding grooves of the slide-piece $j^2$. The sliding head W' is provided with a slot, $l^2$, adapted to receive the wrist-pin $m^2$ of the operating-crank $a^3$, located at the forward end of the shaft H, which extends through the bore of the hub $x'$ to a point in advance of the front face of the carrier-wheel, as shown in Fig. 5. The sliding head W' is provided with a projecting shank, $n^2$, having an open groove, $g^2$, at the front side of the same, as shown in Fig. 8, adapted to receive the shank $o^2$ of the pricking-forcer $X^2$. (Shown in front elevation in Fig. 12, in top view in Fig. 13, and an end view in Fig. 14.) The pricking-awls $p^2$ are preferably held in a circular disk, $q^2$, which is held upon the face of the pricking-forcer $X^2$ by means of the screws $r^2$. The circular disk $q^2$ and the enlarged head $s^2$, to which the disk is attached, are provided with the longitudinally-directed grooves $t^2$, which are adapted to receive the inwardly-projecting plates $i^2$, which serve to guide the edges of the heel-lifts, the shape and relative position of the heel-lifts being shown by the dotted lines in Fig. 14. The pricking-forcer $X^2$ is laterally deflected at its rear end, and provided with the adjusting-screw $u^2$, by means of which the forward limit of the pricking movement of the awls may be regulated with proper precision. The pricking-forcer $X^2$ is secured to the sliding head Y', (shown in front elevation in Fig. 9, in end elevation in Fig. 10, and in top view and partial section in Fig. 11, and also in its working connection with other parts in the horizontal section, Fig. 5,) the collared shank $v^2$ of the screw $u^2$ loosely entering the open slot $w^2$ at the front side of the laterally-projecting rear end of the sliding head Y'. The sliding head Y', which serves to operate the pricking-forcer, is provided at its back side with an angular groove, $x^2$, (partially shown in dotted lines in the front elevation, Fig. 9, and shown by full lines in the top edge view, Fig. 11,) and the slot $x^2$ is adapted to receive the smaller end portion, $y^2$, of the wrist-pin $m^2$, as shown in Fig. 5. The pricking-forcer $X^2$ is provided with an axial perforation, $z^2$, which is adapted to receive the cylindrical shank $b^3$ of the clearing-forcer $c^3$, which is shown in top view in Fig. 15, and forward end view in Fig. 16. The clearing-forcer is provided at its rear end with the laterally-projecting arm $e^3$, which arm is adapted to pass through the slot $f^3$ in the shank of the sliding head W'.

Figures 9, 10, 11, 12, 17:
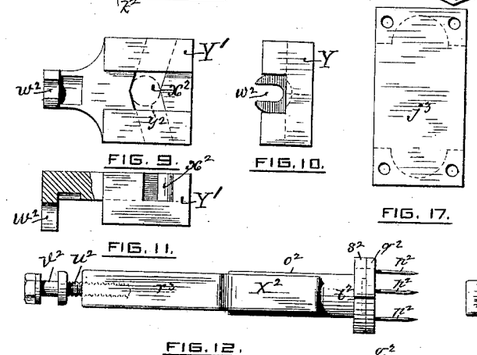
Figure 18:
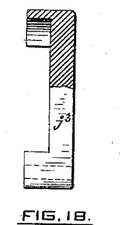
Figure 19:
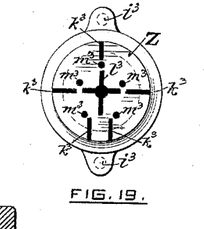
Figure 22:
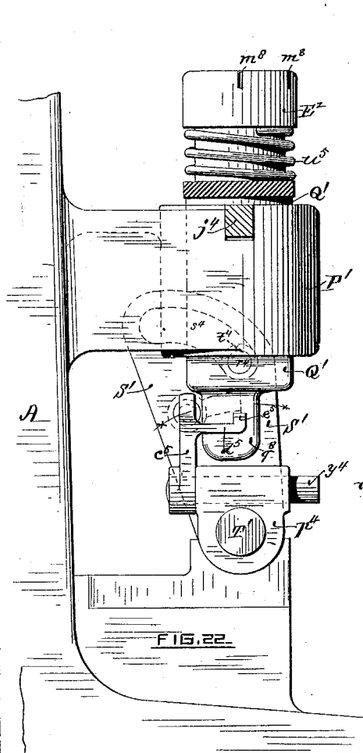
Figs. 22, 23, 24, and 25 are enlarged detail views of the heel nailing and forming mechanism.

Upon the forward end of the shank $n^2$ of the sliding head W' is placed the plunger-head Z, which is bored out to fit the exterior of the shank, and is held thereon by means of the set-screw $h^3$, (shown in the vertical section, Fig. 6,) and the working position of the plunger-head Z is adjustably controlled by means of the adjusting-screws $i^3$, the heads of which rest against the forward edge of the cap-piece $j^3$, which is shown in side elevation in Fig. 17, also in edge elevation and partial section in Fig. 18, and which is secured to the sliding head W' by means of the corner-screws. (Shown in Fig. 1.) The forward end of the plunger-head Z, as shown in the end view of the same, Fig. 19, is provided with the open slots $k^3$, which are adapted to receive the inwardly-directed guide-plates $i^2$ at the heel-lift-receiving openings of the carrier-wheels V V'. The plunger-head is also provided with the central cross-opening, $l^3$, which is adapted to receive the cross-bars of the clearing-forcer $c^3$, and also with the perforations $m^3$, adapted for the required projection of the pricking-awls $p^2$. The back side of the rear portion of the plunger-head is provided with an open groove, $n^3$, (see Fig. 5,) within which is placed the spiral spring $o^3$, which is adapted to force back the arm $e^3$ of the clearing-forcer, and thus to cause the immediate retraction of the cross-bars of the clearing-forcer $c^3$ within the cross-opening $l^3$ of the plunger-head.

Figure 6:
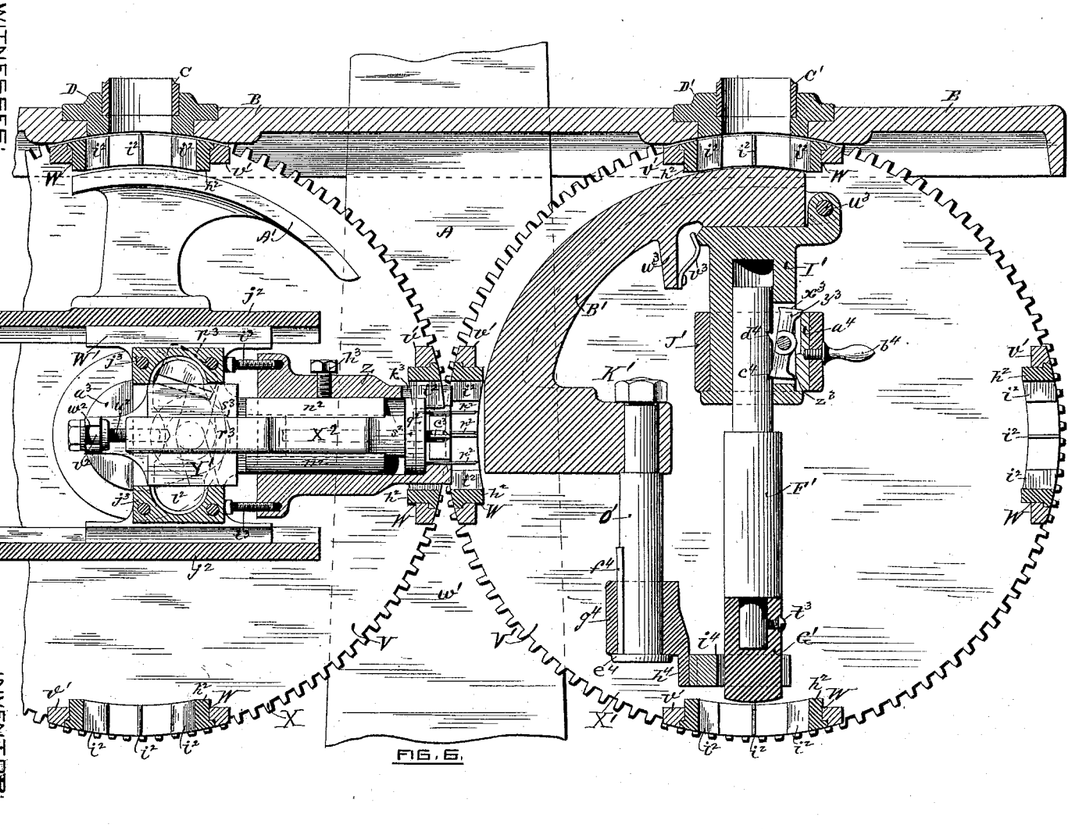
Fig. 6 is an enlarged detail section taken vertically through the axis of the heel-lift cutters, showing the cutters, the geared revolving carriers, the pricking mechanism, and the mechanism of the holding-jack employed for attaching the heel directly to the boot or shoe.

Upon the left-hand edge of the crank $a^3$ is secured the cam-plate $p^3$, which is shown in edge view in Fig. 5 and by heavy dotted lines for side elevation in Fig. 6, and the proper revolution of the shaft H and crank $a^3$ will cause the cam $p^3$ to strike the outer end of the arm $e^3$, and thus cause the forward projection of the cross-bars of the clearing-forcer $c^3$.

In putting the several parts of the above-described pricking mechanism together the shank of the clearing-forcer is first inserted within the bore of the pricking-forcer $X^2$, and the arm $e^3$ attached to the rear of the shank $b^3$. The sliding head Y' is then placed in its sliding seat $q^3$ at the front side of the sliding head W', with the angular groove $x^2$ placed upon the smaller portion, $y^2$, of the wrist-pin $m^2$. The shank $o^2$ of the pricking-forcer $X^2$ is then placed within the groove $g^2$ of the shank $n^2$ of the sliding head W', the projecting arm $e^3$ of the clearing-plunger passing through the slot $f^3$ in the shank of the sliding head W', and the rearward laterally-deflected portion $r^3$ of the pricking-forcer is adapted to enter the groove $s^3$ at the front side of the sliding head Y', the adjusting-screw $u^2$ being at the same time held in the slot $w^2$ at the rear end of the sliding head Y', and when the several parts have been so assembled, the cap-piece $j^3$ will serve to secure the whole in place for working operation.

To the upper edge of the slide-piece $j^2$ is secured the heel-lift pressing head and guide A', (shown in elevation in Fig. 6,) the said guide being circularly curved on its outer face and adapted to prevent the heel-lifts from being forced inward from the guide-plates $i^2$ by the downward action of the cutting-plunger P, and to prevent the same from falling from the guide-plates in their passage from the receiving horizontal position of the guide-plate bushing $h^2$ at the upper side of the carrier to the vertical position of the same in advance of the heel-pricking mechanism.

To the frame A is secured the circularly-formed bracket-arm B', which, like the above-described guide A', located at the inner side of the lugs $v'$ of the carrier-wheel V, serves to prevent the inward forcing of the heel-lifts and also to support the same when subjected to the action of the pricking mechanism. The holding-socket I' for the heeling-jack F' is pivoted to the upper end of the arm B' at the point $u^3$, and the heeling-jack F' is held therein in the line of the downward continuation of the axis of the heel-lift cutter C' and in the plane of the axis of the heel-lift-receiving openings of the carrier. The lower end of the heeling-jack F' is provided with a head, G', which is made removable from the cylindrical shank portion of the jack by means of the screw $t^3$, and heads G' of various sizes are to be provided for the different sizes of heels required to be attached to the soles of shoes. The jack F' is loosely held and thus adapted for a limited up-and-down movement in its holding-socket I', which socket is held in its normal or working position by means of a spring, $v^3$, secured to the downwardly-extending arm $w^3$. The socket-piece I' is provided at one side with a slot, $x^3$, within which is pivoted the double-ended dog $y^3$, and upon which the cylindrical exterior of the socket-piece is placed the encircling-sleeve J', which is made capable of receiving an up-and-down movement upon the socket-piece, and is retained at its lower position by resting upon the shoulder $z^3$ at the lower end of the socket-piece. The sleeve J' is also provided with a projecting handle, $b^4$, by means of which the sleeve may be moved by the operator of the machine whenever required.

To the inner side of the sleeve J' is secured the cam $a^4$, which upon the upward movement of the sleeve will cause the movement of the dog $y^3$ out of the notch $c^4$ on the shank of the jack, so as to allow the jack to be raised within the socket-piece to a position in which the upper end of the dog $y^3$ will engage with the upper notch, $d^4$, on the shank, thus serving to hold the jack at its highest position.

To the inwardly-projecting lug K', at the lower end of the bracket-arm B', is secured the downwardly-projecting stud O', provided at its lower end with a head, $e^4$, and the holding-spline $f^4$, and loosely upon the stud O' is placed the sleeve $g^4$, grooved longitudinally in its bore to receive the spline $f^4$, which serves to prevent the sleeve from turning upon the stud.

To the arm $h^4$, which extends downward from the sleeve $g^4$, is secured the U-shaped spring $i^4$, which serves to clasp the heel portion of the upper of the shoe when the heel is being attached to the sole of the same in the machine, and also to steady the lower end of the heeling-jack.

Upon the right-hand side of the frame A is cast the lug P', which is bored out in the line of a downward extension of the jack to receive the reciprocating head Q', which is provided with a lateral extension, $j^4$, the enlarged outer portion of which is bored out to receive the spindle $k^4$ of the rotative plunger-carrying table R', the said spindle $k^4$ being provided at its lower end with an attached sleeve, $l^4$, having a downwardly-projecting flange, $m^4$, at its lower end, the said flange being provided with diametrically-opposite notches, $n^4 n^4$. The lower portion of the head Q' is provided diametrically with a slot, $o^4$, which is adapted to receive the slotted cam S', the said cam being firmly secured to the rocking shaft T', which is held in the bearings $p^4 q^4$ of the frame A.

Upon the pin $r^4$, which passes from side to side through the lower portion of the reciprocating head Q', and within the slot $s^4$ of the cam, is placed the friction-roll $t^4$. The thicker lower portion of the cam S' is bored out to form a chamber, $u^4$, adapted to receive the sliding clutch-bolt $v^4$, said bolt being provided with a collar or enlargement, $w^4$, back of which is placed the spiral spring $x^4$.

At the upper side of the bearing $p^4$ and transversely of the same is placed the short rock-shaft $y^4$, upon the outer end of which is secured the horizontal arm $z^4$, from which connection is made with the treadle $a^5$ by means of the connecting-rod $b^5$.

To the inner end of the shaft $y^4$ is attached the upright arm $c^5$, the front upper face of which is made to rest against the outer end of the sliding bolt $v^4$. The arm $c^5$ is provided with a laterally-extending arm, $d^5$, the upwardly-turned end $e^5$ of which serves to control the movement of the bolt $v^4$ in timely relation to the proper rotation and adjustment of the rotative plunger-table R', which, when in proper adjustment relatively to the carrier-opening containing the heel-lifts, into which the nails are to be inserted, will allow the end $e^5$ to enter one of the notches $n^4$, and thereupon the end $e^5$ of the arm $d^5$ will operate as a controlling-stop for the rotative plunger-table while the nails are being inserted by the automatic movement of the machine.

To the front side of the loose gear G is secured the cam U', the groove $f^5$ of which is shown in dotted lines in Fig. 1.

To one end of the rock-shaft $g^5$, which is supported in the hanger-bearing $h^5$, is secured the arm $l^5$, which is provided at one side with a friction-roll adapted to enter the groove of the cam U', and to the opposite end of the shaft $g^5$ is secured the segment-gear $A^2$, the arm and segment-gear being shown by dotted lines in Fig. 1. The segment-gear $B^2$ is placed loosely upon the rock-shaft T', and meshes with the teeth of the segment-gear $A^2$, to which a continuous vibrating movement is imparted by means of the cam U'. The gear G and cam U' are continuously driven by means of the pinion C², arranged upon the pulley-shaft D². The front side of the segment-gear B², adjoining the cam S' and in line with the axis of the chamber $u^4$, is bored out at $j^5$ to receive the projecting end of the bolt $v^4$, which, when projected beyond the face of the cam S', will enter the hole $j^5$, and thus cause the simultaneous vibration of the cam S' and segment-gear B², and the consequent reciprocation of the head Q'. One end of the rotative plunger-carrying table R' is bored out and threaded to receive the adjustable hollow screw $k^5$, which is counterbored at its under side to receive the head $l^{5*}$ of the screw $m^5$, to the upper threaded end of which is secured the inverted cup-formed plunger-head E².

Within the chambered upward extension $n^5$ of the table R' is placed the annular block $o^5$, having an encircling-flange, $p^5$, and to the upper face of the said block is attached the plate $q^5$, which is secured to the block by means of the screws $r^5$, and to the plate $q^5$, at proper intervals corresponding to the pricked holes in the heel-lifts, are secured the nail-forcing plunger-pins $s^5$, which enter a corresponding series of perforations, $t^5$, made in the face of the plunger-head E².

Encircling the upward entension $n^5$ of the rotative table R' and pressing upward against the lower edge of the cup-formed plunger-head E² is placed the spiral spring $u^5$. At the opposite end of the rotative table R' is formed the annular upward extension $v^5$, which is adapted to receive the shank $w^5$ of the heel-forming die F². The annular extension $v^5$ is provided at its exterior surface with a screw-thread, which is adapted to engage with the corresponding screw-thread of the adjusting-sleeve $x^5$, which serves to support the edge of the heel-forming die F² adjustably. The die F² is also provided with the hollow central tightening-screw $y^5$, which serves to hold the die firmly upon its seat at the upper edge of the adjusting-sleeve $x^5$. The chamber $z^5$ of the die is made in heel form, and the die F² is centrally bored to receive the clearing-forcer $a^6$, which is provided with an enlarged head portion, $b^6$, and a smaller downwardly-extending shank portion, $c^6$, which extends centrally through the bore of the hollow screw $y^5$. The head portion $b^6$ of the clearing-plunger is made hollow and provided with an internal screw-thread, and the upper end portion of the shank $c^6$ is provided with a screw-thread adapted to fit the corresponding thread of the head $b^6$, and by means of the above-mentioned screw-threads the length of the clearing-forcer may be adjusted as desired.

To an ear, $d^6$, projecting from the side of the laterally-extended portion $j^4$ of the reciprocating head Q', is pivoted the hand-lever $e^6$, by the upward movement of which the clearing-forcer $a^6$ is to be operated for removing a finished heel-blank from the die. The rotative table R', beyond the heel-forming die F², is provided with the upward extension, $f^6$, which is bored out and provided with a screw-thread adapted to receive the corresponding screw-thread of the upright pin $g^6$, which, when set at the proper elevation, may be prevented from turning by means of the screw $h^6$. The lugs $v'$ of the carrier-wheel V' are each provided with a perforation, $i^6$, adapted to loosely receive the pin $g^6$, and to the lug $j^6$, at the back of the sleeve J', (shown in dotted lines in Fig. 2,) is secured the downwardly-extending rod $k^6$, which is adapted for engagement with the upwardly-moving pin $g^6$ upon the passage of the said pin through the perforation $i^6$ to a point inside of the lug $v'$ of the carrier-wheel.

Figures 15, 16, 20, 21:
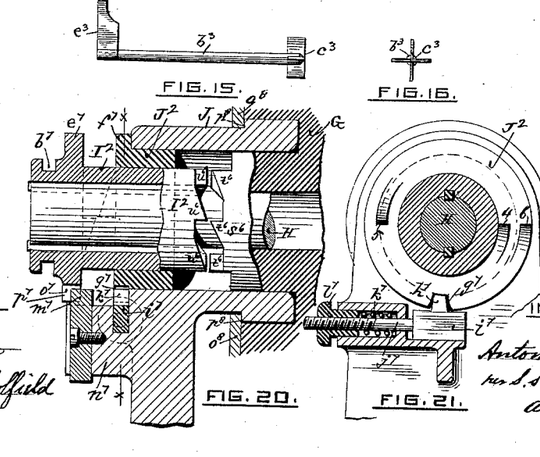
Figs. 20 and 21 are enlarged sectional details of the disengaging-clutch mechanism.

Upon the shaft H is secured the cam G², (shown partially in full and partially in dotted lines in Fig. 2,) the resting portion $l^6$ of the cam-groove being made to extend through ninety degrees of the periphery of the cam, and below the shaft H and parallel therewith is placed the sliding rod $m^6$, which projects from a hole bored for the reception of the same in the bearing-bracket $d^2$, and upon the outer end of the rod $m^6$ is secured the sleeve $n^6$, and its pin $o^6$, which enters the groove of the cam, as shown in dotted lines, and upon the rod $m^6$ is also secured the clutch-fork $p^6$, which serves to operate the clutch Y, and between the hub of the clutch-fork and the shoulder $q^6$ is placed the spiral spring $r^6$. The outer end of the hub $s^6$ of the loosely-revolving gear G, which is shown in enlarged detail section in Fig. 20, is provided with the clutch-teeth $t^6$, adapted to engage with the similar teeth, $u^6$, of the sliding clutch I², which is operated for engagement with the clutch-teeth $t^6$ by means of the pivoted pedal $v^6$, which is connected to the sliding clutch I² by means of the pivot-shaft $c^7$, to the opposite end of which is attached the arm $d^7$, (shown in dotted lines in Fig. 2,) the connecting-rod $w^6$, horizontal arm $x^6$, secured to one end of the rocking shaft $y^6$, the upright arm $z^6$, secured to the opposite end of the shaft $y^6$, and the pivoted shoe $a^7$, which enters the circumferential groove $b^7$ of the sliding clutch I².

Figure 3:
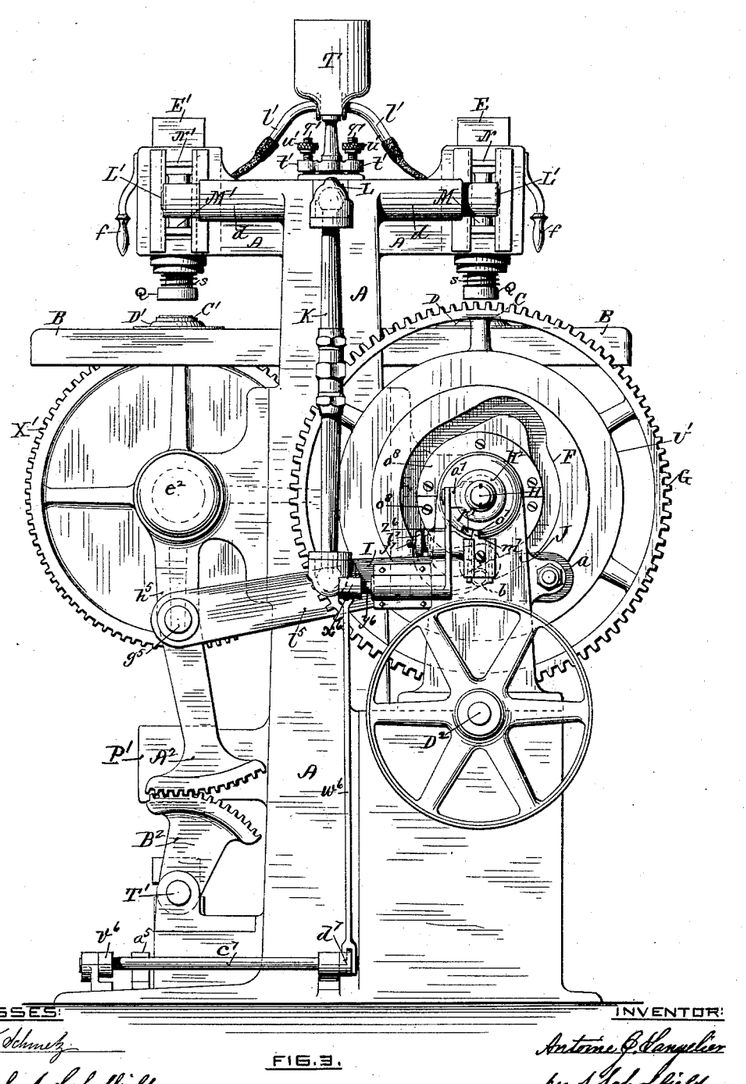
Fig. 3 is a rear elevation of the machine, in which the heel-nailing plunger and its accessory attachments are omitted.
Figure 4:
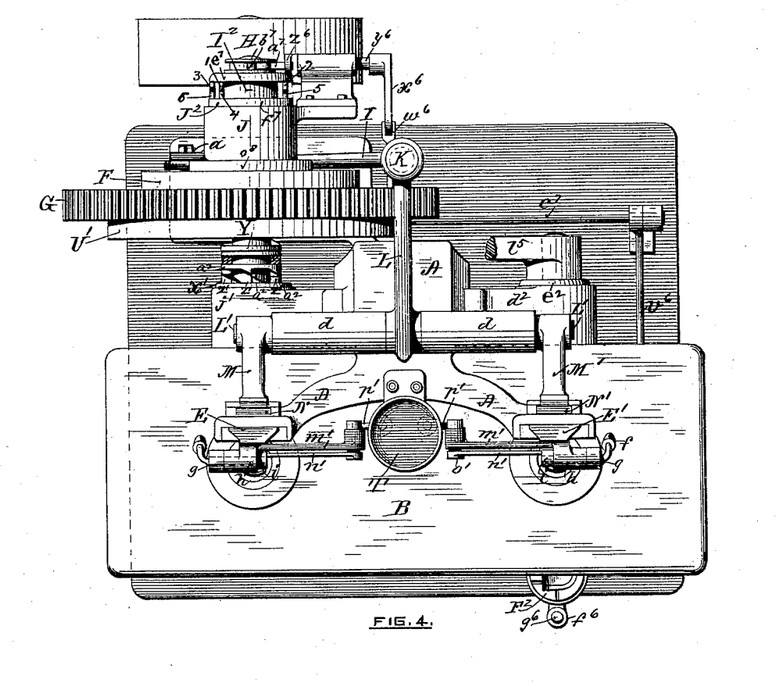
Fig. 4 is a plan view of the machine with one of the cam-operated levers broken away and the paste-supplying tubes omitted.

In order that the clutch I² may be automatically disengaged at each complete revolution of the shaft H, I provide at the rear end of the sliding clutch-sleeve I² a flange, $e^7$, provided on its forward face with the inclined spurs 1, 2, and 3, arranged in non-interfering concentric circles about the axis of the clutch-sleeve, the spur 1 being nearest the axis of the same, the diametrically-opposite spur 2 being farther removed from the axis of the sleeve, and the spur 3, which is placed diametrically opposite to the spur 2 and parallel with the spur 1, being still farther from the axis than the spur 2, as shown in Fig. 4; and loosely upon the clutch-sleeve I² and partly within the enlarged bore of the bearing of the standard J is placed the sleeve J², provided on its outer face with the inclined spurs 4, 5, and 6, which are located with reference to each other and to the axis of the clutch-sleeve similarly to the spurs 1, 2, and 3, but having their inclined sides in the reverse direction. The lower edge of the flange $f^7$ of the sleeve $J^2$ is provided with a notch, $g^7$, (shown in Figs. 20 and 21,) which is occupied by the spur $h^7$, projecting upward from the head $i^7$ of the spring-bolt $j^7$, which is provided with an encircling spiral spring, $k^7$, and regulating-nut $l^7$, by means of which the head of the bolt is adjusted for a limited spring movement, and by the engagement of the spur $h^7$ and notch $g^7$ the limited movement of the bolt will impart a slight rotary movement to the sleeve $J^2$; and in order to prevent the untimely removal of the clutch $I^2$ from engagement with the clutch-teeth of the hub of the loose gear G, I secure a fixed pin, $m^7$, to the lug $n^7$, which projects rearward from the bearing-standard J, the pin being located in such a position relatively to the flange $e^7$ of the sliding clutch that when the clutch is in proper engagement the flange $e^7$ will revolve immediately in front of the fixed pin $m^7$, and at the required point for the automatic disengagement of the clutch I provide a notch, $o^7$, in the edge of the flange $e^7$ and bevel the back edge of the flange beyond the notch, as shown in Fig. 3, and the bevel $p^7$ serves to insure the complete engagement of the clutch upon throwing the clutch-sleeve forward by means of the connected pedal $v^6$.

Figure 2:
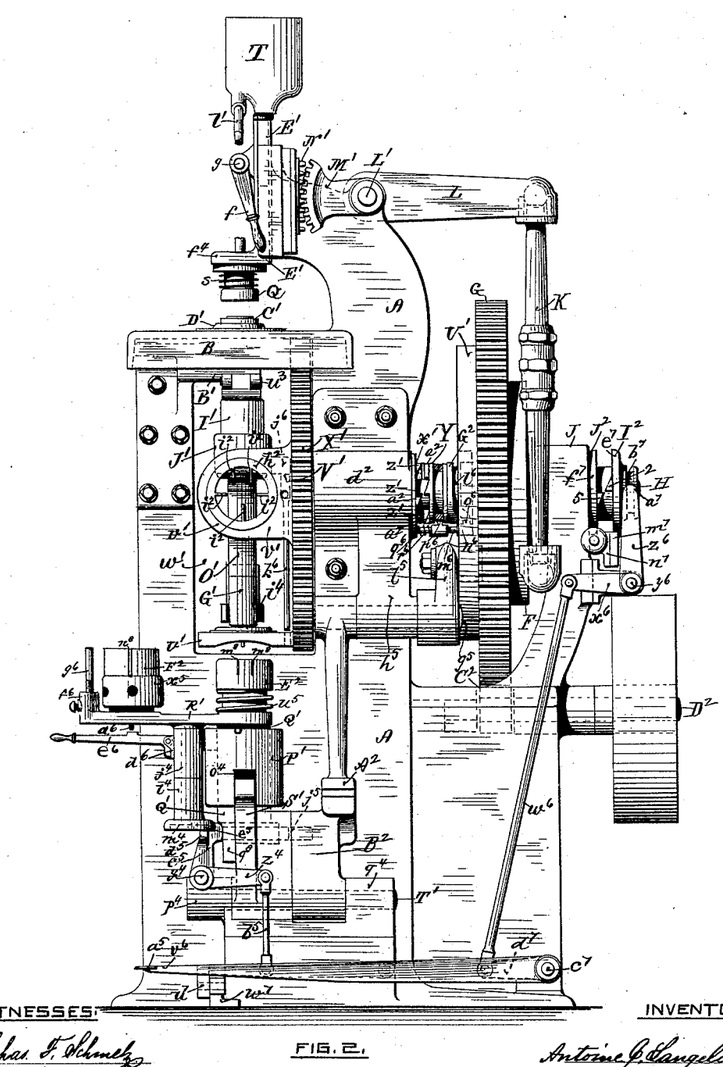
Fig. 2 is an elevation of the right-hand side of the machine with the paste-carrying tube broken away.

Between the downwardly-projecting bars $t^7$ and $u^7$, attached to the pedals $a^5$ and $v^6$, is placed the standard $w^7$, attached to the base-flange of the frame A, as shown in Figs. 1 and 2, and to the forward side of the standard $w^7$ is pivoted the dog $x^7$, the lower edge of which is made a trifle longer than the distance between the adjacent sides of the bars $t^7$ and $u^7$, and the said bars are provided with notches $a^8$ $b^8$, arranged opposite to the lower projecting ends of the dog, so that upon the downward movement of one of the treadles the dog will be forced over into engagement with the notched bar of the opposite treadle, thus securely locking the same and preventing the accidental engagement of both of the clutch mechanisms at the same time, which would result in breaking or damaging some of the parts.

I do not wish it to be understood that the main features of my invention are only applicable to rotating carriers having radially-directed openings. I have simply preferred to represent them in combination with such carriers; but the revolving carriers shown in Figs. 31 and 32 may be advantageously employed in carrying out my invention, Fig. 31 being a top view of the carriers and their connecting-gears; Fig. 32, a vertical section of the table and diametrical section of the carriers, taken in the line $x\ x$ of Fig. 1; and Fig. 33, a separate plan view of the removable heel-lift-holding bushing of the carrier.

Figure 31:
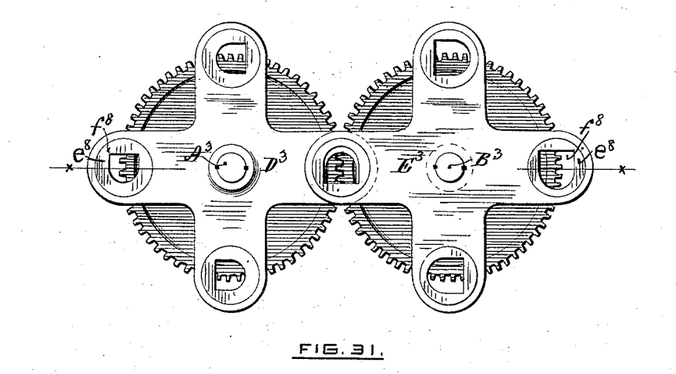
Figs. 31, 32, and 33 are views showing a modified construction of the carriers.
Figure 32:
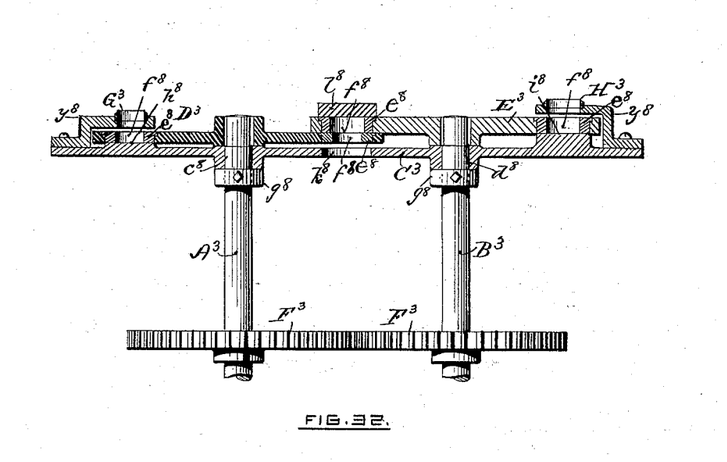
Figure 33:
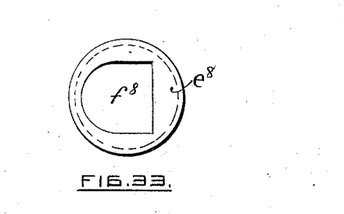

Referring to Figs. 31 and 32, $A^3\ B^3$ are two upright shafts, which at their upper ends are held in the bearings $c^8\ d^8$, formed in the table $C^3$. Upon the upper end of the shaft $A^3$ is secured the four-armed carrier-plate $D^3$, provided with openings adapted to receive the removable bushings $e^8$, which are provided with an opening, $f^8$, made in heel form, as shown in the enlarged plan view, Fig. 33, and upon the upper end of the shaft $B^3$ is secured the four-armed carrier-plate $E^3$, which is preferably made thicker than the plate $D^3$, and is also provided with bushings $e^8$, having an opening, $f^8$, of greater area than that of the bushings of the carrier-plate $D^3$. Collars $g^8$ may be placed upon the shaft to prevent endwise movement of the same, and upon the shafts $A^3\ B^3$, at a suitable distance below the table $C^3$, are secured the interlocking gears $F^3$, which serve to secure the simultaneous revolution of the carriers. The table $C^3$ is provided with circularly-arranged bearing-guides $h^8\ i^8$, which are raised above the general surface of the table and extend under the heel-receiving openings of the carriers, being adapted to receive the thrust of the forcer, which acts in combination with the cutting-plunger. The cutters $G^3\ H^3$, which, for convenience of illustration, are placed over the extreme openings of the carriers in Fig. 32, are held in a raised support, $y^8$, and are made in form and size to correspond with the receiving-openings of the carriers located under the same. When the carriers $D^3\ E^3$ are revolved, the arms of the carrier $D^3$, adapted to receive the smaller heel-lifts, will pass immediately under the corresponding arm of the carrier $E^3$, and in carrying out my invention with the above-described carriers I arrange the pricking forcer and plunger for forcing the smaller heel-lifts into contact with the larger heel-lifts in the opposite carrier below the table, so that they will pass up through the perforation $k^8$, made in the table for that purpose, and above the overlapping arm of the carrier $E^3$, and secured to the upper surface of the table, is placed the stationary pressing-head $l^8$, which is adapted to resist the upward action of the compressing-plunger and the pricking-forcer; and in carrying my invention still further the jack would be located above and the nailing mechanism below the table; but the relative action of the several parts will not be substantially modified by the changed construction of the carriers, excepting that the plungers will be made in heel form to loosely fit the openings $f^8$.

The heel-nailing plunger $E^2$ (shown in section in Fig. 23, and in top view in Fig. 29) is provided with the grooves $m^8$, adapted to receive the holding-plates $i^2$ of the carriers upon the upward movement of the plunger. The forming-die $F^2$ is also provided with vertical grooves $n^8$, adapted for the same purpose, being shown in plan view in Fig. 5, and in section in Fig. 23. The hub of the gear G is provided with an annular recess adapted to receive the inner end of the standard-bearing J, as shown in the section Fig. 20, and at the outer side of the cam F, which is attached to the gear G, are secured the semi-rings $o^8$, (shown in side elevation in Fig. 3,) which by catching behind the shoulder $p^8$ of the bearing will serve to prevent sidewise movement of the loose gear G upon the engagement or disengagement of the carrier-driving clutch.

Figures 23, 24, 25:
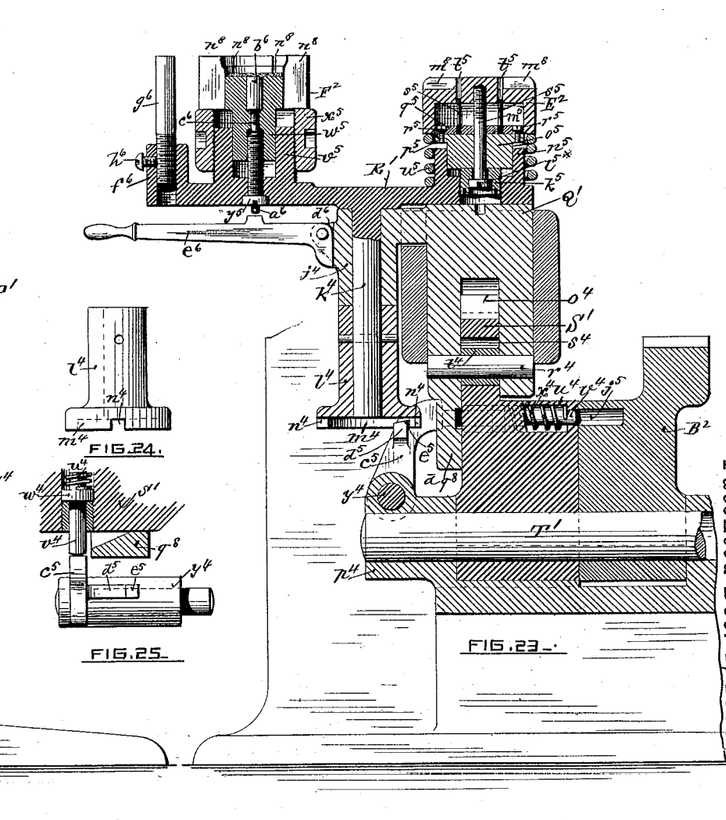

The head Q' (shown in section in Fig. 23) is provided with a downwardly-projecting ear, $q^8$, which at its inner side is beveled, as shown in the detail section, Fig. 25, in order that upon the forward movement of the bolt $v^4$ and consequent movement of the cam S' the bolt will be forced into complete locking engagement with the segment $B^2$, and by this means liability of accident will be prevented.

In operating the machine the leather is to be fed under the cutting-plungers at each side of the table B, the cutter C' being made slightly larger than the cutter C, thus producing heel-lifts of two sizes, the lifts formed by means of the larger cutter being adapted for the upper portion of the heel, while the smaller lifts are to be attached thereto so as to form the lower portion of the same. The downward movement imparted to the sliding heads E E' will first cause the raising of the valve $u$ from its seat $v$, thus allowing the paste to fall upon the upper surface of the leather previous to the action of the lift-cutting mechanism, and as the sliding heads continue their downward movement the projecting head $y$ of the valve-stem, which has been held stationary by the spring $d'$, will strike the end of the regulating-screw $z$, and the valve will thereafter continue in its raised condition until the downward movement of the sliding head has caused the projecting spur $c'$ to become disengaged from the end of the spring $d'$, whereupon the valve will, by reason of the superincumbent fluid paste and the weight of the valve and its stem, become immediately closed to its seat $v$, thus shutting off the further supply of paste, and, if desired, a spring may be employed to effect the immediate closure of the valve. After the paste-supplying valve has thus become closed and further flow of paste prevented, the continued downward movement of the sliding heads will cause the holder Q to be brought down upon the upper surface of the pasted leather strip from which the lift is to be cut, thus clamping the leather firmly around the upwardly-projecting edge of the cutter, and during the continued downward movement of the sliding heads the holder Q will be firmly pressed against the leather at the outside of the cutter by means of the spiral spring $s$.

The downward movement of the cutting-plunger, which is made in heel form to closely fit the heel-formed cutter, will cause the separation of a heel-lift from the pasted leather strip, and the paste-supplying forcer R, which, after the cutting of the heel-lift has, by reason of the action of the arm $m'$, lever $n'$ $p'$, and the spring-bolt $q'$, a more extended downward movement than that of the cutting-plunger, will serve to carry the heel-lift downward into the carrier-opening between the adjacent edges of the guiding-plates $i^2$. The heel-lift first deposited between the guiding-plate will rest in contact with the stationary head or guide A' or B' at the back of the guiding-plates, and upon the continued reciprocation of the sliding heads of the machine an equal number of lifts will be deposited in the receiving-openings of the carriers V and V', the forcer R being caused to make a gradually-decreasing downward movement by reason of the obstruction caused by the accumulated deposit of heel-lifts, until at a certain point, shown by the graduation $q^7$, made on the upward extension of the forcer, the movement of the sliding head is to be stopped by the operator of the machine by withdrawing the locking-bolt $e$ through the proper movement of the handle $f$. Upon the proper filling of the carrier-receiving openings, one with the large and the other with the small sized heel-lifts, as above described, and the disengagement of the lift-cutting mechanism, the operator, by means of the pedal $v^6$, effects the proper engagement of the clutch $I^2$ with the clutch-teeth $t^6$ at the hub $s^6$ of the loosely-revolving gear G, which engagement will cause the shaft H to make one complete revolution, the clutch $I^2$ becoming automatically disengaged at the exact completion of a single revolution by reason of the contact of the inclined spurs 2 and 5 at one side of the axis of the clutch-sleeve $I^2$, and the correspondingly-inclined spurs, 1 and 3, 4 and 6, at the opposite side of the axis of the same, the loose sleeve $J^2$ being at the initial contact of the oppositely-inclined surfaces of the spurs slightly rotated against the action of the spring $k^7$ until the head of the adjusting-nut $l^7$ strikes the shoulder $r^7$, and then the action of the inclined surfaces of the spurs will cause the forcible disengagement of the clutch, whereupon the sleeve $J^2$ will be immediately rotated back to its normal position by means of the spring $k^7$, thus leaving the clutch $I^2$ in a position for ready re-engagement subsequent to the renewed action of the cutting mechanism. The arrangement of the inclined spurs in non-interfering concentric circles allows the clutch to make the entire revolution required, the spur 2 passing between the spurs 4 and 6, and the spur 5 passing between the spurs 1 and 3, and by means of the diametrically-opposite inclined spurs the disengaging movement of the clutch will be made without a cramping tendency. The engagement of the clutch $I^2$ by causing a single revolution of the shaft H will also cause the corresponding revolution of the cam $G^2$, which is so arranged relatively to the movement of the cam F, which operates the sliding heads E E', that the portion $l^6$ of the cam-groove which serves to hold the clutch Y in engagement with the catch-spurs $z'$ of the hub of the carrier V will be in operative engagement for only one-quarter of the revolution of the shaft, thus serving to bring another receiving-opening under the cutters, and to carry the previously-filled openings to a position adjacent to each other in advance of the compressing and pricking mechanism, and at the completion of the movement of the carrier through the space of ninety degrees the clutch Y will become disengaged by the action of the cam-groove $l^6$, and upon the disengagement of the clutch Y, and the consequent stopping of the revolution of the carriers, the plunger Z will be caused to move forward by the action of the crank $a^3$, slot $l^2$, and wrist-pin $m^2$, thus serving to force the accumulation of smaller heel-lifts in the opening of the carrier V from the said opening into forcible contact with the accumulation of larger heel-lifts in the opening of the carrier V′, and upon the complete compression of the lifts against the stationary head $s^7$, immediately back of the guiding-plates of the carrier and while held under such compression, the awls of the pricking-forcer will be caused to advance by the action of the pin $m^2$ of the crank and the angular slot $x^2$ of the sliding head Y′, and to prick the lifts to the required depth, whereupon the awls will be withdrawn by the continued movement of the crank $a^3$ and shaft H, and upon the simultaneous retrograde movement of the plunger Z and the pricking-forcer the clearing-forcer $c^3$ will be projected by the action of the cam $p^3$, thus preventing the lifts from following the plunger in its retrograde movement, after which the clearing-forcer will be retracted by the action of the spring $o^3$, and at the ensuing disengagement of the clutch $I^2$ the plunger Z will have been brought back to its extreme rearward position preparatory to the succeeding movement of the carriers. Upon again starting the carrier-wheels by throwing the clutch $I^2$ in engagement with the hub of the gear G the heel-lifts deposited, as above described, in the receiving-opening of the carrier V′, will be brought to the lower side of the carrier, and in line with the axis of the heeling-jack F, upon which a partially-finished boot or shoe adapted for heeling is to be placed, the jack being inserted into the foot-opening of the boot or shoe when the jack is at the upper position in its socket I′, and after such insertion the jack is to be brought to its lower position, in which it will be firmly held by the action of the dog $y^3$, and in this position the lower end of the jack will be supported by the clasping spring-jaws $i^4$. The table R may now be revolved to a position in which access may be had to the openings $t^5$ in the face of the plunger $E^2$, in which the nails are to be placed preparatory to their insertion into the previously-picked holes in the heel-lifts. The table R is then to be rotated to a position immediately under the carrier-opening, so that upon the downward movement of the treadle $a^5$ and the consequent forward movement of the arms $c^5$ the upwardly-projecting end $e^5$ of the deflected arm $d^5$ will enter the table-holding notch $n^4$, and it will be readily seen that the flange $m^4$ will serve to prevent the engagement of the clutch-bolt $v'$ with the continuously-vibrating segment $B^2$ when the plunger $E^2$ is not in proper line with the carrier-opening and the jack. The proper engagement of the end $e^5$ with the notch $n^4$ will allow the required forward movement of the arm $c^5$, thus forcing the spring-bolt $v^4$ into engagement with the opening $j^5$ of the vibrating segment $B^2$, from which a reciprocating movement will be imparted to the head Q′ and plunger $E^2$ by reason of the consequent vibrating movement of the cam S′. The upward movement of the head Q′ will first cause the plunger $E^2$ to strike the surface of the lower heel-lift in the opening of the carrier, and the consequent compression of the spring $u^5$ upon the continued upward movement of the head Q′ will cause the nail-forcers $s^5$ to advance and insert the nails to the required depth in the previously-pricked holes of the heel-lifts. The said heel-lifts being at this time held against the bottom of the boot or shoe which is secured to the jack, the driven nails will therefore attach the heel to the boot or shoe, and may be clinched thereto by striking against the convex surface of the head G′. Upon the completion of the succeeding downward movement of the head Q′ the cam S′ is to be released from engagement with the vibrating segment $B^2$ and the table R′ revolved, so as to bring the heel-forming die $F^2$ in line with the carrier-opening, and in case it is desired to apply a top lift to the heel the properly-cut top lift is to be first placed in the bottom of the chamber $z^5$ of the die, then upon depressing the treadle $a^5$ an upward movement will be imparted to the die $F^2$, the pin $g^6$ at the same time entering the hole $i^6$ in the base of the lug $v'$ of the carrier-wheel V′, and by striking the lower end of the downwardly-projecting rod $k^6$, which is connected with the sleeve J′, will cause the upward movement of the said sleeve, thus operating to disengage the dog $y^3$ from the notch $c^4$, allowing the jack to rise with the upward movement of the forming-die until the shank of the jack strikes against the upward shoulder, after which the continued upward movement of the die will cause the outer surface of the heel to be pressed into form and the top lift to be securely pressed upon the projecting heads of the nails, as usual in attaching top lifts; and when the movement of the die is reversed by the backward movement of the cam S′ the jack will be retained in its upper position by the dog $y^3$, the upper end of which will have been forced into the notch $d^4$ by the action of the cam $a^4$, thus leaving the jack in a position in which the boot or shoe can be readily removed therefrom, by first swinging the jack to one side upon its pivot-joint $u^3$. In case, however, that it is only desired to form up the heels without attaching the same to the boot or shoe in the machine, the jack may be made as a permanently-fixed head located just free of the inner edge of the guiding-plates $i^2$, and in this case the nailed and pressed heel will be withdrawn, with the die in its downward movement being firmly held therein by the friction of the sides of the chamber $z^5$ of the die, and upon revolving the table, so as to bring the die over the lever $e^6$, which serves to raise the clearing-forcer $a^6$, the operator can readily remove the nail-inserted heel-blank from the die.

I claim as my invention—

1. The combination of the intermittently-revolving carriers with their heel-lift-receiving openings adapted for the reception of heel-lifts of different sizes with means, substantially as described, for forcing the accumulated smaller heel-lifts in the receiving-openings of one of the carriers into forcible connection with the accumulated larger heel-lifts in the corresponding receiving opening of the opposite carrier, the pricking-awls arranged to operate through the smaller receiving-opening of one of the carriers to prick the combined lifts when held in the larger receiving-opening of the opposite carrier, and means, substantially as described, for operating the said awls.

2. The combination of the intermittently-revolving carriers having their openings adapted for the reception of heel-lifts of different sizes with means, substantially as described, for forcing the accumulated smaller heel-lifts in the receiving-opening of one of the carriers into forcible connection with the accumulated larger heel-lifts in the corresponding receiving-opening of the opposite carrier, the pricking awls operating through the smaller receiving-opening of one of the carriers to prick the combined lifts when held in the larger receiving-opening of the opposite carrier, and means for driving nails into the said lifts upon the succeeding movement of the carriers, substantially as described.

3. The combination of an intermittently-revolving carrier provided with heel-lift-receiving openings of uniform dimensions extending through the carrier and adapted to embrace the edges of the heel-lifts and for discharging the same at either side of the said receiving-opening with the stationary pressure head or guide, which serves to prevent the inward movement of the lifts beyond the inner edge of the receiving-openings when the inclosed lifts are subjected to inwardly-directed pressure, substantially as described.

4. The combination of the intermittently-revolving carrier, provided with heel-lift-receiving openings, with the movable heeling-jack arranged interiorly of the carrier in the plane of the axis of the heel-lift-receiving openings of the same, substantially as described.

5. The combination of an intermittently-revolving carrier, provided with heel-lift-receiving openings, with the heeling-jack arranged interiorly of the carrier in the plane of the heel-lift-receiving openings, the sliding joint, and the catch substantially as described.

6. The combination of an intermittently-revolving carrier, provided with heel-lift-receiving openings, with the heeling-jack arranged interiorly of the carrier in the plane of the axis of the heel-lift-receiving openings, the sliding joint, the catch, and the pivoted joint, substantially as described.

7. The combination of an intermittently-revolving carrier, provided with heel-lift-receiving openings, with a heeling-jack arranged interiorly of the carrier in the plane of the axis of the receiving-openings of the same, the reciprocating head, the rotative table attached thereto, the nail-driving head, and the heel-forming die, arranged for operation substantially as described.

8. The combination of an intermittently-revolving carrier, provided with heel-lift-receiving openings, with a heeling-jack arranged interiorly of the carrier in the plane of the axis of the receiving-openings of the same, the reciprocating head, the rotative table attached thereto, the nail-driving head, and the heel-forming die attached to the rotative table, and the clearing-forcer of the heel-forming die, all arranged for operation substantially as described.

9. The combination of an intermittently-revolving carrier, provided with heel-lift-receiving openings, with a heeling-jack arranged internally of the carrier in the plane of the axis of the receiving-openings, the pivot-joint of the heeling-jack, the sliding joint of the same, and the forked rest adapted to embrace the heel portion of the shoe-upper and to steady the free end of the heeling-jack, substantially as described.

10. The combination of an intermittently-revolving carrier, provided with heel-lift-receiving openings, with a holding-jack arranged internally of the carrier in the plane of the axis of the receiving-openings of the same, the pivoted socket-piece for holding the jack, the double-ended dog pivoted thereto, and the cam adapted to operate the pivoted dog so as to hold the heeling-jack in its two positions, substantially as described.

11. The combination of the reciprocating heel-forming die and an intermittently-revolving carrier, provided with heel-lift-receiving openings, with a heeling-jack arranged internally of the carrier in the plane of the axis of the receiving-openings of the same, the pivoted socket-piece for holding the jack, the double-ended dog pivoted thereto, and the means for operating the pivoted dog in timely relation to the forward movement of the heel-forming die.

12. In a heel-machine, the combination of the stationary heel-lift cutter, the reciprocating cutting-plunger, the paste-carrying tubular forcer, adapted to force the heel-lifts through the stationary cutter, the valve and stem, with a projecting head provided with a catch and the fixed spring adapted for engagement with the projecting head of the valve-stem, whereby upon the downward movement of the cutting-plunger the paste-supplying valve will be both opened and closed and the paste be fully supplied to the upper surface of the leather previous to the cutting of the lift, substantially as described.

13. In a heel-machine, the combination of the intermittently-revolving carrier for the heel-lifts, the automatically-disengaged clutch for operating the same, the sliding clutch operatively connected to a pedal and provided with the diametrically-opposite disengaging-spurs, two upon one side of the axis of the sliding clutch and one upon the other, and arranged relatively to the said axis, as described, with a loose encircling-sleeve provided upon its outer face with disengaging-spurs adapted to match the corresponding disengaging spurs upon the clutch, the spring-operated bolt which engages with the sleeve, and the fixed pin adapted to enter a notch in the flange of the clutch and to prevent the untimely disengagement of the same, substantially as described.

14. In a heel-machine, the combination of the heel-lift carrier, stationary heel-lift cutter, reciprocating cutting-plunger, and the graduated forcer adapted to force the heel-lifts through the cutter and into the receiving-opening of the carrier and to indicate the thickness of the accumulated heel-lifts to the operator, substantially as described.

15. In a heel-machine, the combination of the reciprocating head, the rotative table attached thereto, the perforated spring-operated head attached to the rotative table, the adjusting-screw, and the block provided with a series of nail-driving plungers adapted to enter the perforations of the spring-operated head and to operate therein, substantially as described.

16. In a heel-machine, the combination of the reciprocating head, the rotative table attached thereto, the cam for imparting a reciprocating movement to the head and table, the spring-operated bolt for operatively connecting the cam to an adjacent vibrating or reciprocating portion of the machine, with the treadle for engaging the bolt with said vibrating or reciprocating portion and the flange for preventing the untimely engagement of said bolt, substantially as described.

17. The combination of the opposite intermittently-revolving carriers having their openings adapted for the reception of heel-lifts of different sizes, the stationary cutters also of different sizes and adapted for their respective revolving carriers, the cutting-plungers adapted for the stationary cutters, the reciprocating heads to which the cutting-plungers are attached, the sliding bolts for operatively connecting the sliding heads with the adjacent reciprocating parts of the machine, and means for effecting the engagement and disengagement of the said parts, whereby both of the cutting-plungers may be operated, or either one of them separately, substantially as described.

18. The combination of the opposite intermittently-revolving carriers provided with heel-lift-receiving openings, the automatically-disengaging clutch adapted to operate the carrier mechanism, a treadle for engaging the said clutch, a heel-nailing mechanism, the treadle and clutch for engaging the same with the adjacent operative mechanism of the machine, and means for preventing the simultaneous engagement of the carrier and the heel-nailing mechanisms by means of their respective treadles, substantially as described.

19. In a heel-machine, the combination of the intermittently-revolving carrier provided with heel-lift-receiving openings which are adapted to hold and guide the edges of the heel-lifts, the heel-lift cutter, the cutting-plunger, the forcer passing through the cutting-plunger and adapted to force the heel-lifts into the carrier-openings, and a stationary head or guide at the back of the receiving-opening adapted to prevent the inward movement of the accumulating heel-lifts when under the action of the forcer, substantially as described.

20. In a heel-machine, the combination of an intermittingly-revolving carrier provided with heel-lift-receiving openings having inwardly-directed guiding-plates which are adapted to hold and guide the edges of the heel-lifts, the reciprocating plunger grooved to receive the guiding-plates of the carrier, and the pricking-forcer, the pricking-awls of which pass through openings in the face of the grooved plunger and are adapted to prick the heel-lifts when held between the edges of the guiding-plates of the carrier, substantially as described.

21. In a heel-machine, the combination of an intermittently-revolving carrier provided with heel-lift-receiving openings, the inwardly-directed guiding-plates at the receiving-openings of the carrier, the reciprocating plunger grooved to receive the guiding-plates, and the stationary pressure-head arranged in close proximity to the back of the guiding-plates and adapted to resist the compressing action of the grooved plunger upon the intervening heel-lifts, substantially as described.

22. In a heel-machine, the combination of an intermittently-revolving carrier provided with receiving-openings having inwardly-directed guiding-plates which are adapted to hold and guide the edges of the heel-lifts, the reciprocating plunger grooved to receive the guiding-plates of the carrier, the pricking-forcer, the pricking-awls of which pass through openings in the face of the grooved plunger, and a stationary head at the back of the guiding-plates adapted to resist the compressing action of the grooved plunger and the thrust of the pricking-awls, substantially as described.

23. In a heel-machine, the combination of an intermittently-revolving carrier provided with receiving-openings having inwardly-directed guiding-plates which are adapted to hold and guide the edge of the heel-lifts, the reciprocating plunger grooved to receive the guiding-plates of the carrier, the stationary head at the back of the guiding-plates, and the clearing-forcer adapted to prevent the compressed heel-lifts from following the plunger in its backward movement from the stationary head, substantially as described.

24. In a heel-machine, the combination of an intermittently-revolving carrier provided with heel-lift-receiving openings having inwardly-directed guiding-plates which are adapted to hold and guide the edge of the heel-lifts, the reciprocating plunger grooved to receive the guiding-plates of the carrier, the pricking-forcer, and the clearing-forcer, arranged and operating substantially as described.

25. In a heel-machine, the combination of the revolving carrier provided with heel-lift-receiving openings having inwardly-directed guiding-plates which are adapted to hold and guide the edge of the heel-lifts, with the nail-inserting plunger grooved to receive the guiding-plate of the carrier, and the head or jack located at the back of the guiding-plates and adapted to receive the thrust of the nail-driving forcers, substantially as described.

26. In a heel-machine, the combination of the intermittently-revolving carrier provided with heel-lift-receiving openings having inwardly-directed guiding-plates, which are adapted to hold and guide the edge of the heel-lifts, with the reciprocating heel-forming die grooved on its face to receive the guiding-plates of the carrier, and a head or jack located at the side of the carrier opposite to the forming-die and adapted to receive the forcible thrust of the forming-die through the carrier-opening, substantially as described.

ANTOINE J. LANGELIER.

Witnesses:
SOCRATES SCHOLFIELD,
JOSEPH J. SCHOLFIELD.